May 25, 1948.   F. A. GILL   2,442,166
LUBRICATING DEVICE
Filed Feb. 14, 1945   4 Sheets-Sheet 4
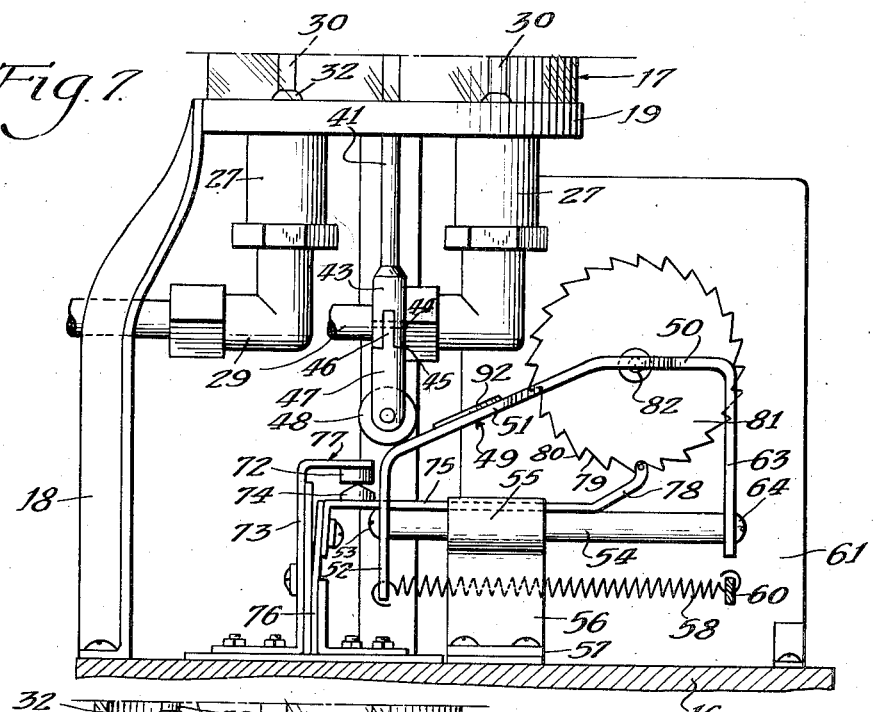
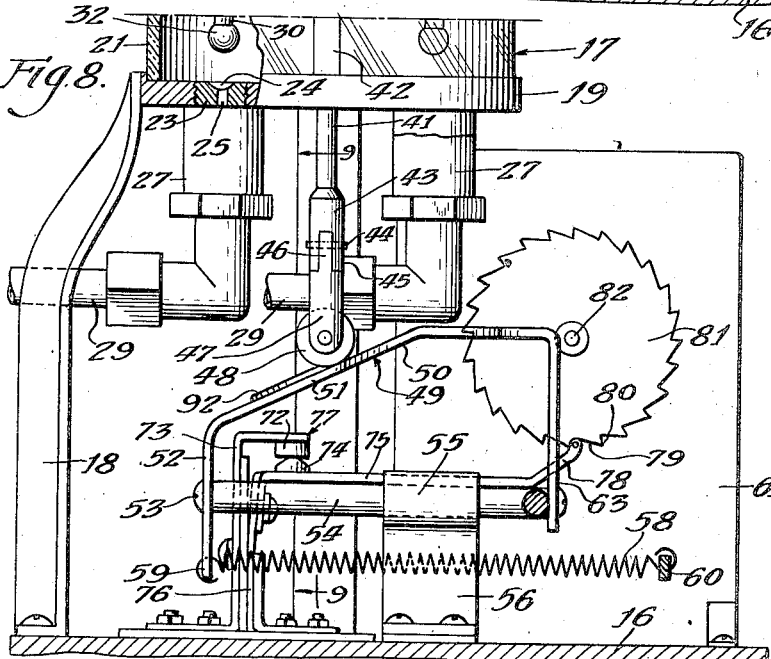
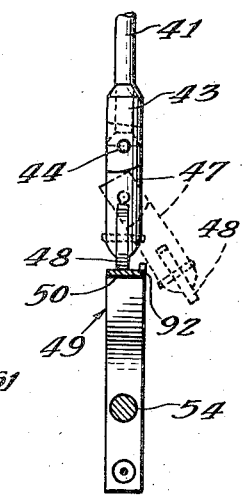
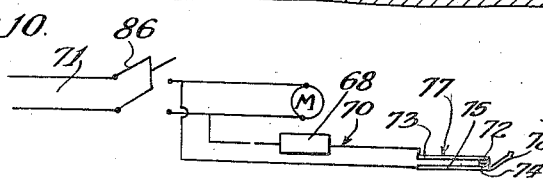
Inventor:
Ferdinand A. Gill
By Wallace and Cannon
Attorneys Patented May 25, 1948

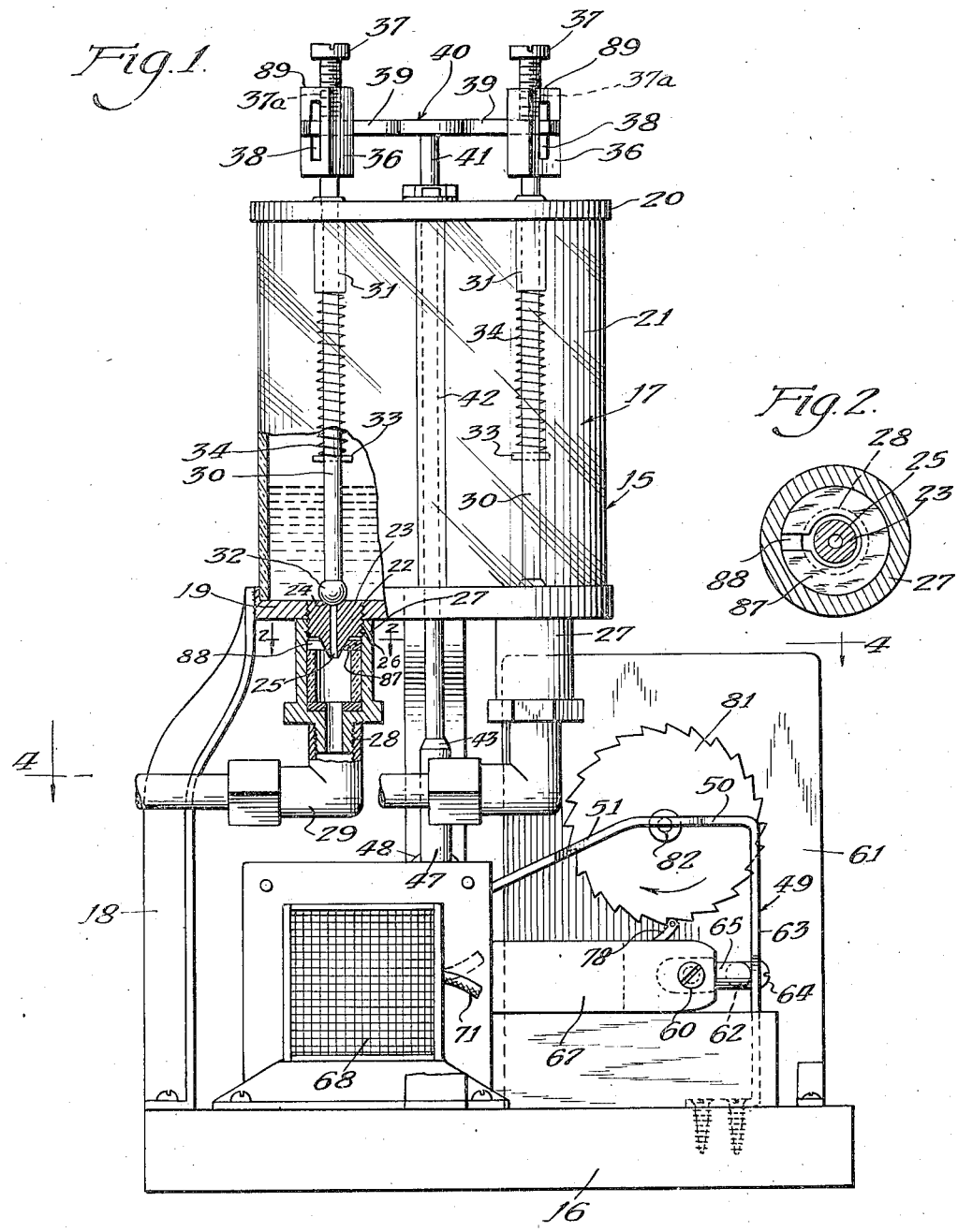

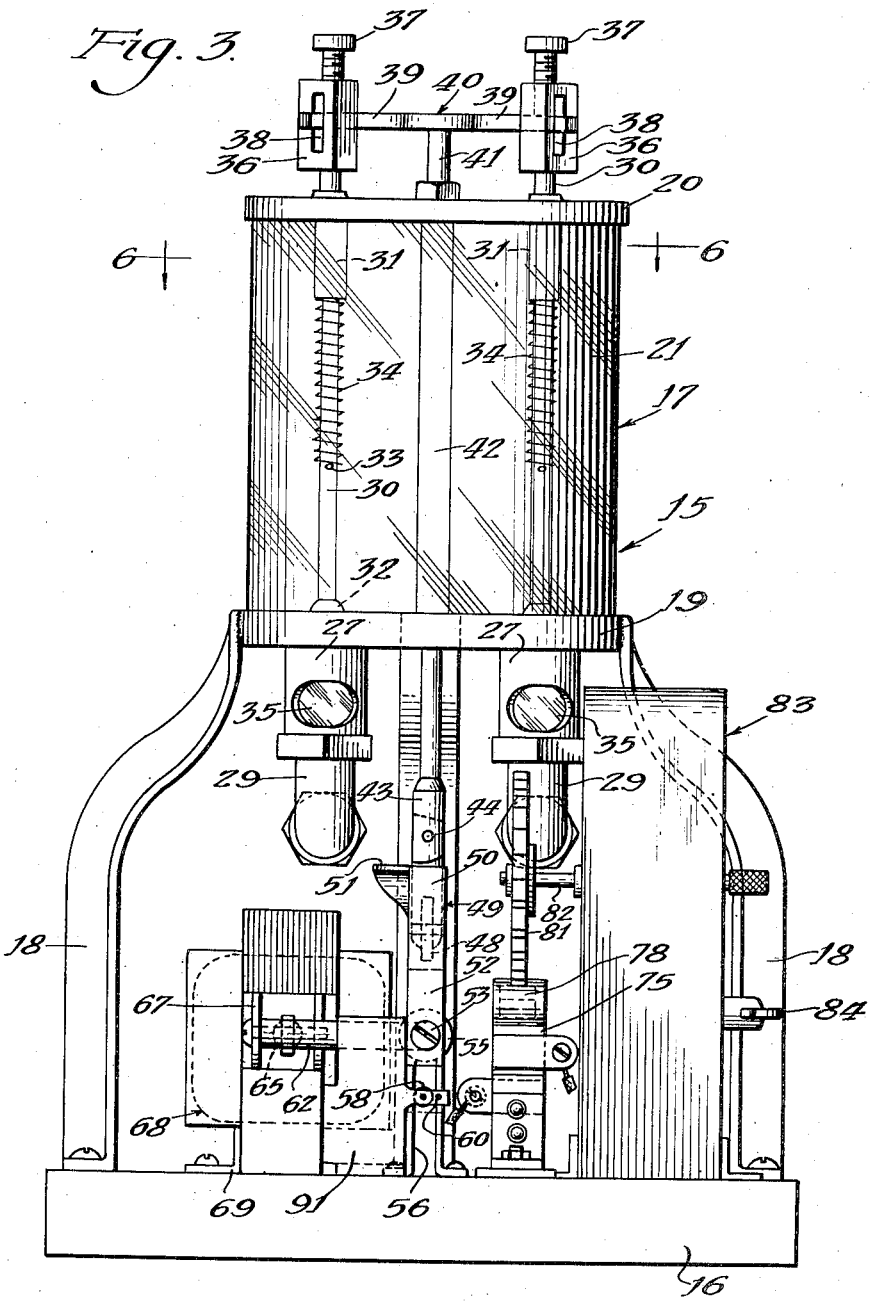

2,442,166

UNITED STATES PATENT OFFICE 2,442,166

LUBRICATING DEVICE

Ferdinand A. Gill, Chicago, Ill.

Application February 14, 1945, Serial No. 577,785

3 Claims. (Cl. 184—67)

This invention relates to a lubricating device. More specifically, this invention relates to a lubricating device which may be used for lubricating the working parts of various power-operated machines, apparatus and devices.

One of the difficulties heretofore experienced in connection with the use of automatic lubricating devices is that they have, in general, been driven from or operated by cam or other mechanisms operated by the machine or device which they were intended to lubricate and hence depended, in part, at least, upon the successful operation of such machine or device for the proper performance of their lubricating function. One difficulty experienced in this connection has been that in the event of failure of those parts of the machine or device which controlled the operation of the lubricating device the latter, in turn, would also fail to perform its lubricating function even though the machine or device which it was intended to lubricate would continue to operate, thereby creating a hazardous condition resulting in burnt-out bearings and resultant loss of the working time of the machine.

Accordingly, an object of the invention is to provide a novel electrically and automatically operated lubricating device for supplying oil to the working parts of a machine, device or apparatus to be lubricated thereby and which new lubricating device is not dependent in any way for its successful operation or for the performance of its lubricating function upon the successful and proper working operation and condition of any of the parts of the machine, device or apparatus lubricated thereby.

An additional object of the present invention is to provide a new and improved electrically operated and time controlled lubricating device for automatically lubricating the working parts of a machine, device, or apparatus with which it may be used.

Another object of the invention is to provide a novel construction and arrangement in the new lubricating device for controlling the quantity of lubricating oil which will flow from the storage container through each of the oil-conducting lines or oil feed pipes during each operation of the new lubricating device.

A further object of the invention is to provide a novel time control mechanism embodied in the lubricating device for controlling the time interval during which oil will flow from the oil storage container into the oil-conducting lines leading therefrom during each cycle of operations of the new lubricating device.

A further object of the invention is to provide in the new lubricating device a novel time-controlled cam mechanism for operating the valves which control the release or discharge of oil from the oil storage reservoir or container.

Another object of the invention is to provide in the new lubricating device a novel manually adjustable device for selectively controlling the operation of the oil-releasing or oil-discharging valves embodied in the new lubricating device so that one or more of such valves may be rendered ineffective while others may be allowed to continue in operation.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Fig. 1 is an elevational view showing a preferred embodiment of the new lubricating device, certain parts of the wall of the oil storage container or reservoir and of one of the outlets therefrom being broken away to reveal the construction of the oil control valves embodied in the new lubricating device;

Fig. 2 is an enlarged sectional plan view on line 2—2 in Fig. 1;

Fig. 3 is an elevational view of the new lubricating device shown in Fig. 1 as seen from the right hand side in Fig. 1;

Figure 5:
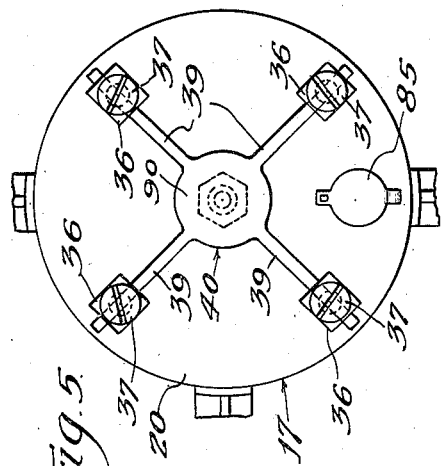
Fig. 5 is a top plan view of the oil storage reservoir or container and of the manually adjustable devices for selectively controlling the operation of the oil-releasing valves.
Figure 6:
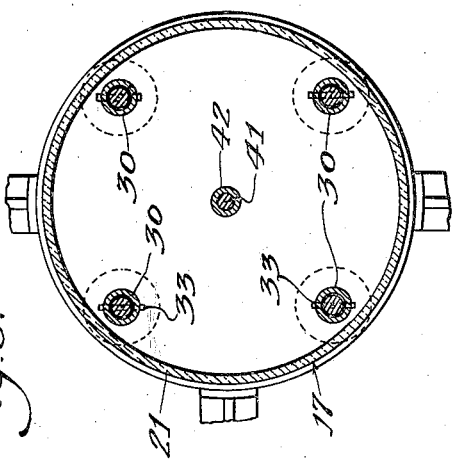
Fig. 6 is a horizontal sectional view on line 6—6 in Fig. 3.

Fig. 7 is a fragmentary side elevational view illustrating the construction of the time-controlled valve operating mechanism embodied in the new lubricating device for controlling the operation of the oil-releasing valves and showing certain parts of the operating mechanism for the oil-releasing valves in the position which they assume at the start of a typical cycle of operations of the new lubricating device;

Fig. 8 is a view similar to Fig. 7 but showing the parts of the operating mechanism for the oil-releasing valves in the position which they assume when the oil-releasing valves are raised so as to release or discharge a quantity of oil from the oil-storage container or reservoir into the oil feed pipes;

Fig. 9 is a view on line 9—9 in Fig. 8, partly in vertical section and partly in elevation, illustrating the construction and operation of the certain parts of the cam mechanism embodied in the new lubricating device for controlling the operation of the oil-releasing valves; and Fig. 10 is a schematic wiring diagram illustrating a suitable electrical circuit which may be embodied in the new lubricating device for energizing the electrical operating motor or solenoid embodied therein.

A preferred embodiment of the new lubricating device is illustrated in the drawings and is therein generally indicated at 15. Said lubricating device comprises a supporting base 16 which may be mounted upon or adjacent to any power or hand-operated machine, device or apparatus having parts, such as bearings, shafts and the like, which may be desired to lubricate by means of the new lubricating device.

The new lubricating device includes an oil storage container or reservoir 17 which is mounted on supporting legs 18 which are carried by the supporting base 16. The oil cup or storage container 17 includes a base or bottom wall 19, which is attached to the supporting legs 18 (Fig. 1), a top wall 20, in which an inlet opening provided with a hinged closure 85 is provided, (Fig. 5), and a transparent side wall 21, through which the height of the oil in the oil cup or storage container 17 may be seen.

The bottom wall 19 of the oil storage container 17 is provided with a group of radially arranged threaded openings 22, one of which is shown in Fig. 1, and arranged in each of these openings 22 is an externally threaded valve seat member 23. Provided in the upper surface of each of the valve seat members 23 is a recess or depression providing a valve seat 24 and each of the valve seat members 23 has a central longitudinally extending passage 25 formed therein providing an oil discharge outlet from the oil storage container or reservoir 17. Each of the valve seat members 23 has an externally threaded lower portion 26, which is disposed below the bottom wall 19 of the oil storage container 17, and threaded onto each of these portions 26 is a fitting or coupling 27 each of which is provided with a sight opening 35 (Fig. 3). Each of these fittings or couplings 27 is connected at its lower end, as at 28, to an oil feed line or pipe 29 by means of which oil may be supplied to a working part such, for example, as a shaft or bearing, in the machine, device, or apparatus with which the new lubricating device is associated. A suitable packing 87 is mounted in the coupling 27 and this packing 87 is provided at its upper end with an air bleed passage 88 for preventing an air block in the fitting or coupling 27.

The new lubricating device includes a plurality of valve stems 30 which extend through the oil storage container or housing 17. Each of these valve stems 30 is slidably mounted in a sleeve or bushing and these sleeves or bushings 31 are mounted in the top wall 20 of the oil storage container or reservoir 17. At its lower end each of the valve stems 30 carries a movable valve element in the form of a ball 32 and each of these balls 32 is engageable with one of the valve seats 24. A pin 33 is mounted in each valve stem 30 and a coil spring 34 is mounted on each valve stem between the pin 33 and the lower end of the corresponding sleeve or bushing 31. These springs 34 normally urge the valve stems and the movable valve elements or balls 30 downwardly into their lowered positions and thereby seat the movable valve elements or balls 32 upon their valve seats 24 so as to close the outlets 25 from the oil storage container or reservoir 17 to the oil feed lines or supply pipes 29.

Each of the fittings or couplings 27 has a sight opening formed in its side wall and each of these sight openings is covered by a piece of transparent material such as glass or the like, so that the flow or drip of oil through the couplings 27 to the oil feed pipes 29 may readily be seen, (Fig. 3).

A member 36 is mounted upon and suitably attached to the upper end portion of each of the valve stems 30, above the upper wall 20 of the oil storage reservoir or container 17, as shown in Figs. 1 and 3. Each of these members 36 has a manually adjustable member in the form of a thumb screw 37 mounted in a threaded opening 37a which is provided therefor in its upper wall 89 (Fig. 1). A pair of aligned slots 38 is provided in opposite side walls of each of the members 36 and an arm 39 of a spider 40 projects through and works in each pair of aligned slots 38 in each of the members 36, and the lower and inner end portion of each of the thumb screws 37 is adapted to bear upon and to engage one of the arms 39.

As shown in Fig. 5, the arms 39 are radially arranged upon and relative to the central portion 90 of the spider 40 and the spider 40 is mounted upon and is carried by a vertically movable cam roller-supporting and valve-operating rod 41. This cam roller-supporting and valve-operating rod 41 is slidably mounted in a tubular guide sleeve or bushing 42 which is mounted centrally in and projects through the body of the oil cup or storage container 17. As shown in Figs. 1, 3, 7 and 9, the cam roller-supporting and valve-operating rod 41 has a bifurcated lower end portion 43. Pivotally mounted, as at 44, between the arms 45 of the bifurcated lower end portion 43 of the cam roller-supporting and valve-operating rod 41 is a tongue portion 46 of a cam roller supporting member 47 upon which a cam roller 48 is rotatably mounted.

The cam roller 48 is engageable with a slidable cam track which is generally indicated at 49. This slidable cam track 49 has an inclined upper cam surface 50 which is provided with a laterally offset or curved central portion 51, best shown in Figs. 3 and 4. The upper cam surface 50 has a guide rail 92 at one end thereof which will be referred to hereinafter.

The slidable cam track 49 has a depending arm 52 at one end and this arm 52 is connected, as by a screw 53, to a slide rod 54. The slidable cam track 49 has a depending arm 63 at its other end and this arm 63 is connected, as by a screw 64 (Fig. 7), to the slide rod 54.

Figure 4:
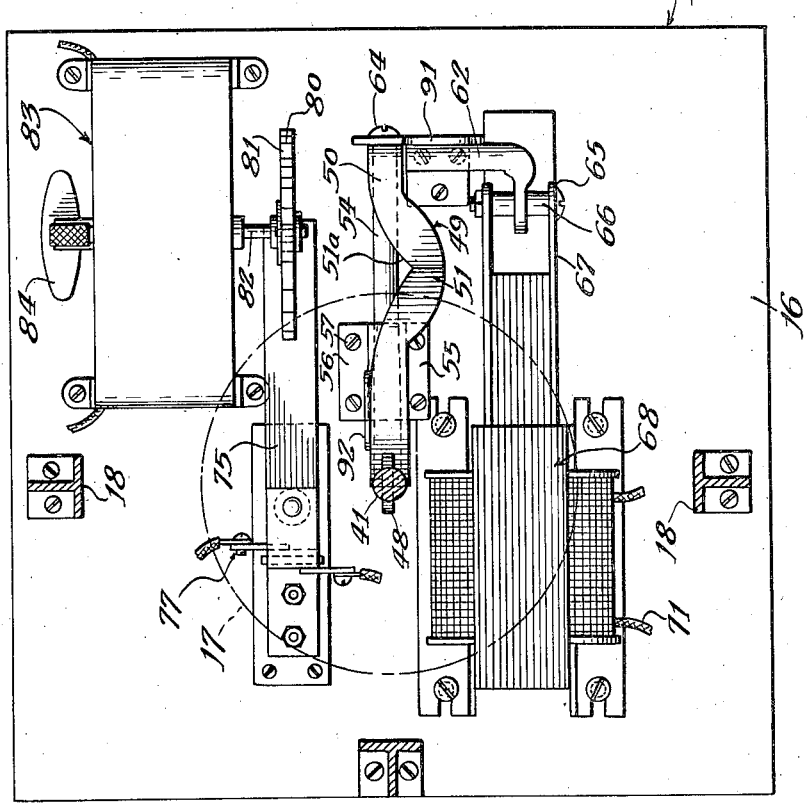
Fig. 4 is a top plan view of the new lubricating device shown in Figs. 1, 2 and 3, the oil storage container or reservoir being removed so as better to illustrate the construction and arrangement of the time-controlled operating mechanism for the oil releasing or oil-discharging valves.

The slide rod 54 is slidably mounted in a supporting and guide sleeve 55 which is formed as a part of a supporting bracket 56 and this supporting bracket 56 is mounted upon the supporting base 16 and is attached thereto, as at 57 (Fig. 4).

A spring 58 has one end portion attached, as at 59, to the depending arm 52 of the slidable cam track 49 and the other end portion of this spring 58 is attached to an arm 60 of an upright stationary member 91 (Figs. 3 and 4), which is mounted upon the supporting base 16.

The slide rod 54 has a rightangularly extending arm 62 at one end (Fig. 4). This arm 62 has a forwardly extending portion 65 (Fig. 4) which extends parallel to the main extent of the slide rod 54 (Fig. 4). This arm 65 is connected, by a pin 66, to the movable element or armature 67 of an electric solenoid 68. As shown in the drawings, the solenoid 68 is mounted, as at 69, upon the supporting base 46.

As shown in Fig. 10 the electric motor or solenoid 68 is arranged in an electric circuit 70 which may be connected, by lead lines 71, to a suitable source of current. The circuit 70 includes a manually operable starting switch 86 for the electric operating motor M of the machine or device with which the new lubricating device may be used and the circuit 70 also includes an automatically operated control switch which is generally indicated at 77. This control switch 77 includes a relatively stationary contact 72 which is carried by a supporting member 73 which is mounted on the base 16 (Fig. 1). The control switch 77 also includes a relatively movable contact 74 which is mounted upon a resilient horizontally extending contact-supporting arm 75 and this supporting arm 75 is, in turn, mounted upon an upright supporting member or bracket 76 which is attached to the supporting base 16 (Fig. 8).

As shown in Figs. 7 and 8, the horizontally extending contact-supporting arm 75, which carries the movable contact member 74 has an upwardly angled end portion 78 and this upwardly angled end portion 78 rides the periphery of and is engageable in notches 79 and with teeth 80 formed in a ratchet 81. This ratchet 81 is rotatably mounted upon a shaft 82 and this shaft 82 forms a part of a time-controlled device having the form of a clock mechanism 83 which is mounted upon the supporting base 16. The clock mechanism 83 is shown as being of the hand wound type and is provided with a handle or finger grip 84 for winding a spring motor embodied therein (not shown). However, it will be understood that the clock mechanism or time-controlled unit 83 may be of any other and suitable type such, for example, as an electrically operated clock mechanism, or other suitable time-controlled device.

*Operation*

In the operation of the new lubricating device a supply of oil or like lubricant may be poured into the oil cup or storage container 17, through the inlet opening with which the closure 85 is associated, the height of the oil in the container 17 being observable through the transparent sidewall 21 thereof.

As shown in Fig. 10, when the control switch 86 for the motor M of the machine or device with which the new lubricating device is used is open, the circuit 70 to the solenoid 68 will be open, and the slidable cam track 49, the slide rod 54, and the armature or movable element 67 of the solenoid 68 are disposed, under the action of the spring 58, in the position in which the parts are shown in Figs. 4 and 7 and in which position the armature 67 of the solenoid 68 is extended relative to the stationary field or body of the solenoid 68.

However, when the operating circuit 70 is energized, by closing the manually operable switch 86 (Fig. 10), the operating motor M for the machine or device with which the new lubricating device is used and the solenoid 68 will both be energized and the solenoid 68 will thereupon pull its movable element or armature inwardly, against the action of the spring 58 (top to bottom as seen in Fig. 4 or right to left as seen in Fig. 1). This movement of the armature 67 of the solenoid 68 acts, through the pin 66, arm 65, and arm 62 to move the slide rod 54 and the cam track 49 inwardly (right to left as seen in Fig. 1 or top to bottom as seen in Fig. 4).

During this operation the cam roller 48 rides upon the inclined upper surface 50 of the slidable cam track 49 and this movement of the cam track 49 acts through the cam roller 48 to raise the vertically slidable cam roller-supporting and valve operating rod 41 and the spider 40 carried thereby. This upward movement of the cam roller-supporting valve operating rod 41 and the spider 40 mounted thereon moves the radially extending arms 39 of the spider 40 upwardly in the slots 38 in the members 36 and during this upward movement of the arms 39 in the slots 38 the arms 39 engage the lower end portions of the thumb screws 37 and thereby raise the thumb screws 37, the members 36 and the valve stems 30, and the movable valve elements or balls 32 which are attached to the lower end portions of the valve stems 30. In this manner the movable valve elements or balls 32 are raised up out of engagement with the valve seats 24. Oil will thereupon flow from the oil storage container 27 into the feed or supply lines 29 to the parts to be lubricated thereby.

It will be noted, in this connection, that the valve stems 30 and the movable valve elements or balls 32 are held in raised position, against the action of the resetting springs 34, during a part of the time interval during which the cam roller 48 is riding the straight portion of the upper surface 50 of the slidable cam track 49. However, as the cam roller 48 begins to ride off from the straight portion 50 of the cam track 49 into the cutaway area or opening 51a formed by the outwardly curved portion 51 of the upper surface of the slidable cam track 49, the pressure of the then compressed resetting springs 34 on the valve stems 30 acts, through the valve stems 30, parts 36, spider 40 and rod 41 to force the cam roller 48 downwardly. Hence as the slidable cam track 49 continues to move (right to left, Fig. 7) the cam roller 48 falls off from the curved portion 51 of the cam track 49 into the indentation or cutaway portion 51a, and during this movement of the cam roller 48 off from the upper surface 50—51 of the slidable cam track 49 the downward pressure of the valve-resetting springs 34, acting through the spider 40 and rod 41 causes the bifurcated lower end portion 47 of the rod 41 to pivot at 44 into the position in which the part 47 and cam roller 48 are shown in Fig. 9. During this operation the springs 34 lower the valve stems 30 and thus reseat the movable valve elements or balls 32 upon their valve seats 24, thus preventing further flow of oil from the oil storage cup or reservoir 17 through the outlet passages 25 into the feed line or pipes 29 until another cycle of operations of the device is repeated.

At the beginning of a cycle of operations of the new lubricating device the parts are disposed as in Fig. 7 and the angled upper end portion 78 of the resilient supporting arm 75 for the movable contact 74 of the control switch 77 is disposed in one of the notches 79 in the ratchet 81, and the contacts 72—74 of the automatically operated control switch 77 are then in engagement with each other. Likewise, when the manual starting switch 86 is closed and the circuit 70 is energized and during the time the solenoid armature 67 and slide rod 54 are moving inwardly, due to energization of the solenoid 68 (right to left, Fig. 7), the angled upper end portion 78 of the resilient supporting arm 75 for the movable contact 74 remains in the notch 79 in the ratchet 81, in which it was disposed at the start of the cycle of operations.

During this operation, however, the ratchet 81 is rotated (clockwise as seen in Figs. 1, 7 and 8), under control of the clock mechanism 83, and as the slidable cam track 49 and the armature 67 of the solenoid 68 approach the end of their inward movement or stroke (right to left, Figs. 7 and 8), the angled upper end portion 78 of the resilient contact-supporting arm 75 rides out of the notch 79 in the ratchet 81 in which it was engaged at the start of the cycle of operations and onto one of the teeth 80 of the ratchet 81. This operation depresses the resilient contact-supporting arm 75 and thereby moves the movable contact 74 out of engagement with the stationary contact 72, thereby opening the control switch 77 and the operating circuit 70 for the solenoid 67—68. The then tensioned spring 58 thereupon returns the solenoid armature 67, slide rod 54 and the slidable cam track 49 to their initial positions, as shown in Fig. 7.

As the slidable cam track 49, and the slide rod 54 and the solenoid armature 67 are returned to their initial positions, by means of the resetting spring 58, the bifurcated lower end portion 47 of the cam roller-supporting and valve operating rod 41 and the cam roller 48 carried thereby are guided by the guide rail 92 back onto the upper surface 50 of the slidable cam track 49 and into coaxial alignment with the body or main extent of the rod 41 (as shown in full lines in Fig. 9). Accordingly, when the slidable cam track 49 has been returned to its initial position, as in Fig. 7, the cam roller 48 is again disposed in engagement with the upper surface 50 of the slidable cam track 49 in the position in which these parts are shown in Fig. 7.

It will thus be seen that the solenoid 68 will remain energized, and the operating circuit 70 therefore will remain closed, until the time interval has elapsed which is required and necessary for the rotary cam element or ratchet 81 to rotate one circumferential step corresponding to the distance between the inner end of one of the notches 79 and the rise or outermost point of the next succeeding tooth 80. Hence by controlling this interval the time interval required to complete a cycle of operations of the new lubricating device may be controlled.

Accordingly, the angled upper end portion 78 of the resilient contact-supporting arm 75 will thereupon ride off of the next succeeding tooth 80 in the ratchet 81 and will enter the next succeeding notch 79 therein. The movable contact 74 will then again engage the stationary contact 72 of the control switch 77, thereby again closing the operating circuit 70 and again re-energizing the solenoid 68, whereupon the foregoing cycle of operations will be repeated.

It will be noted that after the manual starting switch 86 has once been closed the operation of the new lubricating device is entirely under the control of the time-controlled mechanism 83 and is thus independent of the operating motor M for, and the operating parts of, the machine, device or apparatus with which it may be used so that in the event of a failure of any of the operating parts of the machine, or apparatus or device with which the new lubricating device is used such failure will not affect the operation of the new lubricating device itself. Hence one of the difficulties experienced heretofore in the use of prior art lubricating devices is overcome.

If and when it may be desired to render one or more of the valves 30—32—24 ineffective, that is to allow it to remain closed, while allowing the other or remaining valves to be operated cyclically, in the manner hereinbefore described, this may readily be accomplished by screwing the corresponding thumb screw 37 upwardly. Hence when the valve operating rod 41 and the spider 40 carried thereby are raised, by action of the slidable cam track 49 and cam roller 48, the arm 39 associated with the particular thumb screw 37 which has been raised or screwed upwardly will merely move upwardly in the slots 38 in the corresponding member 36 but will not engage the lower end of the thumb screw 37 which has been so adjusted into ineffective position. Hence the corresponding valve stem 30 will remain in its lowered position and the valve 32—24 controlled thereby will remain closed while one or more of the remaining valves 30—32—24 are allowed to operate.

It will thus be seen from the foregoing description, considered in conjunction with the accompanying drawings, that the present invention provides a novel time-controlled lubricating device which has the novel and desirable advantages and characteristics, and accomplishes its intended objects, including those hereinbefore pointed out and others which are inherent in the invention.

I claim:

1. A lubricating device comprising an oil storage container having an outlet for directing oil to a part to be lubricated; a valve including a movable valve element for controlling the flow of oil from said oil storage container through said valve outlet; means including a vertically movable valve-operating member for moving the said movable valve element into open position; an electric circuit including a solenoid having a movable element for operating the said valve-operating member; a control switch for closing and opening the said electric circuit; and a time-controlled mechanism for closing and opening the said control switch; the said means for moving the said movable valve element into open position including a slidable cam track operable by the said movable element of the said solenoid; and a cam roller carried by the said vertically movable valve-operating member and engageable with the said sliding cam track for moving the said vertically movable valve-operating member into raised position and the said movable valve element into open position.

2. A lubricating device comprising an oil storage container having an outlet for directing oil to a part to be lubricated; a valve including a movable valve element for controlling the flow of oil from said oil storage container through said valve outlet; means including a vertically movable valve-operating member for moving the said movable valve element into open position; an electric circuit including an electric motor for operating the said vertically movable valve-operating member; a control switch for closing and opening the said electric circuit; and a time-controlled mechanism for closing and opening the said control switch; the said electric motor including a movable element; the said means for moving the said movable valve-operating member into open position including a slidable cam track operable by the said movable element of the said motor; and a cam roller carried by the said vertically movable valve-operating member and engageable with the said slidable cam track for moving the said vertically movable valve-operating member into raised position and the said movable valve element into open position.

3. A lubricating device as defined in claim 2 in which said slidable cam track includes a curved portion and in which the said cam roller is pivotally mounted upon the said vertically movable valve-operating member for movement off from and onto the curved portion of the said slidable cam track.

FERDINAND A. GILL.

REFERENCES CITED

The following references are of record in the file of this patent:

UNITED STATES PATENTS

| Number | Name | Date |
|---|---|---|
| 517,127 | Purvis | Mar. 27, 1894 |
| 1,202,895 | Rogers | Oct. 31, 1916 |
| 1,763,961 | Gits | June 17, 1930 |
| 2,302,423 | Davis | Nov. 17, 1942 |

FOREIGN PATENTS

| Number | Country | Date |
|---|---|---|
| 5,377 | Great Britain | 1888 |